Patented Aug. 1, 1939

2,168,161

UNITED STATES PATENT OFFICE 2,168,161

PRODUCTION OF CARBOXYLIC ACID AMIDES

Heinrich Hopff, Ludwigshafen-on-the-Rhine, Hans Kellermann, Mannheim, and Adolf Freytag, Ludwigshafen-on-the-Rhine, Germany, assignors to I. G. Farbenindustrie Aktiengesellschaft, Frankfort-on-the-Main, Germany No Drawing. Application June 19, 1937, Serial No. 149,208. In Germany June 23, 1936

9 Claims. (Cl. 260—557)

The present invention relates to a new process of producing carboxylic acid amides.

We have found that carboxylic acid amides can be prepared in an advantageous manner by causing a carbamic acid chloride (i. e. carbamic acid chloride itself or its substitution products, especially its alkyl substitution products) to act on aliphatic and cycloaliphatic hydrocarbons or their substitution products, in particular their halogen substitution products. As suitable initial materials there may be mentioned for example normal butane, isobutane, chlorpentanes, hexanes, heptanes, octanes, octodecanes, butylene, decylene, octodecadiene, cyclopentane, cyclohexane, bromcyclohexane, hexahydrotoluene, hexahydroxylenes, cyclohexene and abietinene. Instead of the single hydrocarbons, natural or artificial mixtures of the same or their substitution products, such as paraffin wax, chlorinated paraffin wax, petroleum jelly, fractions of aliphatic or naphthenic petroleums, as for example benzines, ligroins, illuminating oils, or aliphatic or cycloaliphatic hydrocarbons and the like obtainable by condensation or polymerization of olefines or mixtures of olefines, for example in the presence of aluminium chloride, or by the destructive hydrogenation of petroleum, mineral coals, brown coals or peat, or in any other way may also be employed.

The reaction may be carried out for example by gradually adding 1, 1½, 2 or more molecular proportions of carbamic acid chloride, methyl- or ethyl carbamic acid chloride to the initial material to which there have already been added 1, 1½, 2 or more molecular proportions of anhydrous aluminium chloride, and then heating the mixture to temperatures at which evolution of hydrogen chloride takes place, the reaction being carried on until the evolution of gas ceases. The reaction is preferably carried out at an elevated temperature, for example between about 80° and about 250° C., advantageously between 100° and 200° C., and, if required, for example when using initial materials of low boiling point, such as pentane or cyclohexane, in a closed vessel. Instead of using the carbamic acid chloride or the like and the aluminium chloride or the like separately, the corresponding stable molecular compounds of carbamic acid chloride with anhydrous aluminium chloride or the like (see Patent 2,052,138) may also be used with advantage. The reaction may be carried out in the presence of indifferent solvents, as for example carbon tetrachloride.

The reaction products are preferably worked up by decomposition with ice or water, distilling off of any excess of hydrocarbon present and purification of the residual crude acid amide, for example by distillation, crystallization or sublimation.

The following examples will further illustrate how the said invention may be carried out in practice but the invention is not restricted to these examples. The parts are by weight.

Example 1

400 parts of the stable molecular compound of aluminium chloride and carbamic acid chloride (prepared according to the said Patent 2,052,138) are added to 400 parts of normal-pentane and the whole is heated in an autoclave for 12 hours at from 130° to 140° C. After decomposing the yellow-brown, semifluid reaction product with ice, the crude acid amide, which separates as an oil, is extracted with ether and distilled in vacuo after evaporating the ether. From the distilled product there are obtained by crystallization white crystals which consist of a caproic acid amide.

Normal-butane, iso-butane and normal-hexane may be converted into carboxylic acid amides in a corresponding manner.

Example 2

400 parts of cyclohexane are condensed with 400 parts of the stable molecular compound of aluminium chloride and carbamic acid chloride and worked up in the manner described in Example 1. The carboxylic acid amide obtained corresponds to the formula:

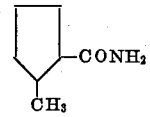

It may be purified by crystallization from ligroin and has a melting point of from 153° to 154° C.

A carboxylic acid amide is also obtained from hexahydrotoluene by corresponding treatment.

What we claim is:

1. The process for the production of carboxylic acid amides which comprises causing a carbamic acid chloride and an anhydrous condensing agent of the Friedel-Crafts' type to act on a compound selected from the class consisting of the aliphatic and cycloaliphatic hydrocarbons and their halogen substitution products.

2. The process for the production of carboxylic acid amides which comprises causing a carbamic agent
pound
phatic
halo-
presence of an ...cess for the production of carboxylic
...comprises causing a carbamic
...ride and an anhydrous condensing agent
...Friedel-Crafts' type to act at a tempera-
...ciently elevated to cause reaction on a
...cted from the class consisting of
...and cycloaliphatic hydrocarbons and
...substitution products.

...rocess for the production of carboxylic
...ides which comprises causing a carbamic
acid chloride and an anhydrous condensing agent
of the Friedel-Crafts' type to act at a temperature
between about 80° and about 250° C. on a compound selected from the class consisting of the aliphatic and cycloaliphatic hydrocarbons and their halogen substitution products.

5. The process for the production of carboxylic acid amides which comprises causing a carbamic acid chloride and an anhydrous condensing agent of the Friedel-Crafts' type to act at a temperature between about 100° and 200° C. on a compound selected from the class consisting of the aliphatic and cycloaliphatic hydrocarbons and their halogen substitution products.

6. The process for the production of carboxylic acid amides which comprises causing a stable molecular compound of a carbamic acid chloride and a condensing agent of the Friedel-Crafts' type to act at a temperature sufficiently elevated to cause reaction on a compound selected from the class consisting of the aliphatic and cycloaliphatic hydrocarbons and their halogen substitution products.

7. The process for the production of carboxylic acid amides which comprises causing carbamic acid chloride and anhydrous aluminium chloride to act at a temperature sufficiently elevated to cause reaction on a compound selected from the class consisting of the aliphatic and cycloaliphatic hydrocarbons and their halogen substitution products.

8. The process for the production of carboxylic acid amides which comprises causing a stable molecular compound of carbamic acid chloride and anhydrous aluminium chloride to act at a temperature sufficiently elevated to cause reaction on a compound selected from the class consisting of the aliphatic and cycloaliphatic hydrocarbons and their halogen substitution products.

9. The process for the production of carboxylic acid amides which comprises causing at least 1 molecular proportion of a carbamic acid chloride and at least 1 molecular proportion of an anhydrous condensing agent of the Friedel-Crafts' type to act at a temperature sufficently elevated to cause reaction on 1 molecular proportion of a compound selected from the class consisting of the aliphatic and cycloaliphatic hydrocarbons and their halogen substitution products.

HEINRICH HOPFF.
HANS KELLERMANN.
ADOLF FREYTAG.